(12) United States Patent
Renard et al.

(10) Patent No.: US 11,030,282 B2
(45) Date of Patent: Jun. 8, 2021

(54) METHOD AND DEVICE FOR SECURING A DOCUMENT, METHOD AND DEVICE FOR CONTROL CORRESPONDING THERETO AND SECURE DOCUMENT

(71) Applicant: ADVANCED TRACK & TRACE, Rueil-Malmaison (FR)

(72) Inventors: Isabelle Renard, Lihus (FR); Zbigniew Sagan, Rueil-Malmaison (FR); Jean-Pierre Massicot, Rueil-Malmaison (FR); Alain Foucou, Rueil-Malmaison (FR)

(73) Assignee: ADVANCED TRACK & TRACE, Rueil-Malmaison (FR)

( * ) Notice: Subject to any disclaimer, the term of this patent is extended or adjusted under 35 U.S.C. 154(b) by 100 days.

(21) Appl. No.: 15/770,204

(22) PCT Filed: Oct. 28, 2016

(86) PCT No.: PCT/FR2016/052823
§ 371 (c)(1),
(2) Date: Apr. 22, 2018

(87) PCT Pub. No.: WO2017/072470
PCT Pub. Date: May 4, 2017

(65) Prior Publication Data
US 2018/0307814 A1 Oct. 25, 2018

(30) Foreign Application Priority Data
Oct. 28, 2015 (FR) ...................................... 1560311

(51) Int. Cl.
*G06F 21/16* (2013.01)
*G06F 21/60* (2013.01)
(Continued)

(52) U.S. Cl.
CPC ............ *G06F 21/16* (2013.01); *G06F 21/602* (2013.01); *G06F 21/64* (2013.01); *G06K 7/1417* (2013.01); *G06K 9/00456* (2013.01)

(58) Field of Classification Search
CPC ........ G06F 21/16; G06F 21/602; G06F 21/64; G06K 7/1417; G06K 9/00456
See application file for complete search history.

(56) References Cited

U.S. PATENT DOCUMENTS

| | | | | |
|---|---|---|---|---|
| 5,974,150 A | * | 10/1999 | Kaish | G06K 19/086 283/85 |
| 2003/0159046 A1 | * | 8/2003 | Choi | H04N 1/32187 713/176 |

(Continued)

OTHER PUBLICATIONS

Zheng et al., A Hybrid Watermarking Technique to Resist Tampering and Copy Attacks, Oct. 2011, 2nd International Symposium on Intelligence Information Processing and Trusted Computing, pp. 111-114 (Year: 2011).*

*Primary Examiner* — Kenneth W Chang
(74) *Attorney, Agent, or Firm* — Patshegen IP LLC; Moshe Pinchas (57) ABSTRACT

The device (100) for protecting a document (125) comprises: —a means (120) for inputting a digital file representing an image of at least a part of the document, —a means (135) of extracting characteristic elements of the image and of positions of said characteristic elements on the document, —a means (140) of encoding characteristic elements of the image and data representative of position of said characteristic elements on the document, and to a matrix code and—a means (155) of printing the matrix code on or in said document. In embodiments, the device comprises: —a means (165) of determining a location of the document not bearing any information, and/or—a means (165) of determining the shape of the matrix code corresponding to (Continued)

the location of the document not bearing information, the printing means printing the matrix code at the determined location and according to the determined shape.

17 Claims, 6 Drawing Sheets

(51) Int. Cl.
*G06F 21/64* (2013.01)
*G06K 7/14* (2006.01)
*G06K 9/00* (2006.01)

(56) References Cited

U.S. PATENT DOCUMENTS

| | | | | |
|---|---|---|---|---|
| 2004/0052400 | A1* | 3/2004 | Inomata | G06T 1/0028 382/100 |
| 2005/0067487 | A1* | 3/2005 | Brundage | G07F 7/08 235/380 |
| 2005/0077346 | A1* | 4/2005 | Dutta | G07B 17/00508 235/375 |
| 2007/0204164 | A1* | 8/2007 | Cattrone | H04L 9/3247 713/176 |
| 2007/0228166 | A1* | 10/2007 | Lui | G07D 7/003 235/454 |
| 2008/0080009 | A1* | 4/2008 | Masui | G06T 1/0028 358/3.28 |
| 2008/0110995 | A1* | 5/2008 | Iftime | B41M 3/144 235/491 |
| 2008/0130746 | A1* | 6/2008 | Soroushian | H04N 19/176 375/240.15 |
| 2008/0292129 | A1* | 11/2008 | Fan | G06F 17/2294 382/100 |
| 2009/0175491 | A1* | 7/2009 | Charpentier | G06K 9/00885 382/100 |
| 2010/0014122 | A1* | 1/2010 | Massicot | G06K 9/522 358/3.28 |
| 2012/0063647 | A1* | 3/2012 | Zhao | G07D 7/20 382/112 |
| 2013/0094064 | A1* | 4/2013 | Massicot | G06K 9/522 358/3.28 |

* cited by examiner

METHOD AND DEVICE FOR SECURING A DOCUMENT, METHOD AND DEVICE FOR CONTROL CORRESPONDING THERETO AND SECURE DOCUMENT

TECHNICAL FIELD OF THE INVENTION

The present invention concerns a method and device for protecting a document, a method and device for control corresponding thereto, and a protected document. It applies, in particular, to protecting documents against content changes (integrity) and counterfeits (copies), and to the authentication and electronic management of documents.

STATE OF THE ART

Currently, the notion of the original of a document bearing a handwritten portion (eg. a signature) is restricted to the physical version of the document.

It has been proposed to introduce provisions into French civil law making it possible to recognize a document's status as an original whether on a paper medium or a digital medium.

However, these texts give no technical specification making it possible to carry out transfers from a physical version to a digital version, and vice-versa, while retaining a document's status as an original.

The purpose of a "faithful digitization" method is to produce a "faithful copy".

There is no legal definition of "faithful copy" in French law, even though these terms are used, in particular in article 1348 of the French Civil Code.

On the other hand, according to the NF Z42-013 standard, a document is faithful "if it makes it possible to reconstitute all the information required for the uses for which the document of origin is intended". It will be noted that the words "document of origin" are used, not "original document". This is not a legal definition, and it has frequently led to discussions and arguments.

In practice, from a legal point of view two types of faithfulness are distinguished for copies (depending on the value of the document of origin and the legal text to which it refers):

"format" faithfulness: it is an "identical" reproduction (visually speaking) of the document of origin;
"informational" faithfulness, which guarantees the identity of the content, and therefore the meaning, between the document of origin and the copy.

Generally, the technical solutions provide formal faithfulness. With regard to the field of application, it consists of defining all the digitization procedures (dematerialization) leading to the production of faithful copies, first in the formal sense.

The procedures to be specified cover all operations, from delivering documents to be digitized through to making digital documents available that are faithful copies of the documents of origin. To enable their management and safekeeping, metadata must be added to these digital objects.

The procedures also comprise verification operations aimed at guaranteeing the result obtained.

It is noted that the operational situation that has to encompass the dematerialization procedure is generally the digitization of sets of documents, sometimes organized or grouped, for example by "application" criteria: customer or supplier files, technical files (plans, notices), etc.

Several criteria must be met:
guarantee of integrity for the processing of the document flow (nothing lost, nothing added);
faithfulness of the images obtained, which consequently leads to guaranteeing legibility and intelligibility;
guarantee of authenticity;
guarantee of integrity for the digital documents obtained;
guarantee of durability for the documents; and
traceability of the operations and retention of "proofs" (in the technical sense).

Complete digitization comprises:
A/ operations prior to digitization:
deposit, identification and content preparation, structuring:
the question of the number of documents and the possible solutions, and
logging the operations
B/ the actual digitization operations:
selecting the level of faithful digitization
an "absolute" type of faithful digitization, in color and coded on 24 bits, for example,
an "intermediate" type of faithful digitization based on 8-bit coding (256 levels of grey), for example,
a "basic" type of faithful digitization in black and white,
choosing a format for the digital document, and
logging the operations
C/ operations after digitization:
adding metadata (technical and application),
removing blank pages,
straightening pages,
cleaning images,
trimming,
affixing a visible mark (2D DOC type of stamp) guaranteeing this is a faithful copy,
sealing the files, and
logging the operations.

As is easily understood, these procedures are complex, burdensome and require significant quantities of data to be processed and stored.

The publications CN 104636642, US 2015/052615, technical publication "Hardcopy Document Authentication Based on Public Key Encryption and 2D Barcodes" by Mohamed Hamdy Eldefrawy et al., scientific publication "Printed Document Integrity Verification Using Barcode" by Husain Affandi et al. and US 2013/286443 are known.

However, none of these publications discloses or suggests extracting positions of characteristic elements in the document processed, or encoding data representative of the position of characteristic elements in the document, in a matrix code.

SUBJECT OF THE INVENTION

The present invention aims to remedy all or part of these drawbacks.

To this end, according to a first aspect, the present invention envisages a device for protecting a document, which comprises:
a means for inputting a digital file representing an image of at least one portion of the document;
a means for extracting characteristic elements of the image and positions of said characteristic elements on the document;
a means for encoding characteristic elements of the image and data representative of the position of said characteristic elements on the document, and to a matrix code; and a means for printing the matrix code on or in said document.

Thanks to these provisions, by decoding the matrix code, one can access characteristic elements of the image and their position on the document. Thus, one can easily partially reconstitute the document and/or compare these characteristic elements with those of the document. In this way, one is assured, firstly, of the integrity of the document and, secondly, that the matrix code is not associated to a document other than the one for which it is intended.

In some embodiments, the device comprises a means for determining a location of the document that bears no information, the printing means printing the matrix code at said location.

Thanks to these provisions, the matrix code is automatically positioned outside portions of the document that bear information.

In some embodiments, the means for determining an available location determines a plurality of areas of the document that bear no information.

Thanks to these provisions, if the matrix code cannot fit into a single portion without being superimposed on information of the document, the matrix code is split into elements positioned in different areas of the document that bear no information.

In some embodiments, the device comprises a means for determining the shape of the matrix code corresponding to the document location that bears no information, the printing means printing the matrix code according to the determined shape.

Thanks to these provisions, the shape of the matrix code best suited to the distribution of information in the document is automatically determined.

In some embodiments, the means for determining a shape determines a plurality of shapes corresponding to a plurality of areas of the document that bear no information.

Thanks to these provisions, the matrix code is automatically split into portions representing shapes suited to the distribution of information in the document.

In some embodiments, the means for inputting a digital file is configured such that the image is:
representative of biometric data of a person, for example his fingerprints or his face, which data items are also carried by the document; or
an image of a portion of the document, for example an accounting or contractual document.

The characteristic elements of the image are, for example, a compression of the image, biometric measurements, measurements taken of the document represented by the image and/or fingerprint minutiae.

In some embodiments, the encoding means is configured such that the matrix code comprises a plurality of areas representing the characteristic elements of the image.

In some embodiments, the device comprises a means for encoding a message in an anti-copy mark, the matrix code printed by the printing means comprising a zone representative of the anti-copy mark.

In some embodiments, the means for encoding a message encodes the message utilizing characteristic elements.

In some embodiments, the means for encoding a message scrambles the message, during the encoding, according to the characteristic elements.

In some embodiments, the means for encoding characteristic elements encodes the characteristic elements utilizing characteristic elements.

In some embodiments, the encoding means comprises a means for compressing the image.

In some embodiments, the compression means performs a compression in JPEG (acronym for Joint Picture Expert Group) format.

In some embodiments, the means for inputting a digital file representative of an image comprises an image sensor configured to take an image of the document on which the matrix code is printed.

In some embodiments, the means for inputting a digital file representative of an image comprises an image sensor for capturing a fingerprint.

In some embodiments, the encoding means comprises a means for extracting fingerprint minutiae.

In some embodiments, the encoding means utilizes a public key for encoding the content of the matrix code.

According to a second aspect, the present invention envisages a method for protecting a document, which comprises:
a step of inputting a digital file representing an image representative of at least one portion of the document;
a step of extracting characteristic elements of the image and positions of said characteristic elements on the document;
a step of encoding characteristic elements of the image and data representative of the position of said characteristic elements on the document, and to a matrix code; and
a step of printing the matrix code on or in said document.

According to a third aspect, the present invention envisages a control device for a candidate document, which comprises:
a means for capturing an image of at least one portion of the document;
a means for capturing an image of a matrix code carried by said document;
a means for decoding the matrix code in order to decode:
characteristic elements of an image of an authentic document; and
positions of said characteristic elements in said authentic document;
a means for verifying the content and position match between:
the image of at least one portion of the document and the characteristic elements of the decoded authentic document.

According to a fourth aspect, the present invention envisages a control method for a document, which comprises:
a step of capturing an image of at least one portion of the document;
a step of capturing an image of a matrix code carried by said document;
a step of decoding the matrix code in order to decode:
characteristic elements of an image of an authentic document; and
positions of said characteristic elements in said authentic document;
a step of verifying the content and position match between:
the image of at least one portion of the document and the characteristic elements of the decoded authentic document.

According to a fifth aspect, this invention envisages a document carrying a matrix code encoding
characteristic elements of an image representative of at least one portion of the document; and
positions of said characteristic elements in the document.

As the particular features, advantages and aims of this protection method, this control device, this control method and this document are similar to those of the protection device that is the subject of the present invention, they are not repeated here.

BRIEF DESCRIPTION OF THE FIGURES

Other advantages, aims and particular features of the present invention will become apparent from the description that will follow, made, as a non-limiting example, with reference to drawings included in an appendix, wherein.

DESCRIPTION OF EXAMPLES OF REALIZATION OF THE INVENTION

It is now noted that the figures are not to scale.

Figure 1:
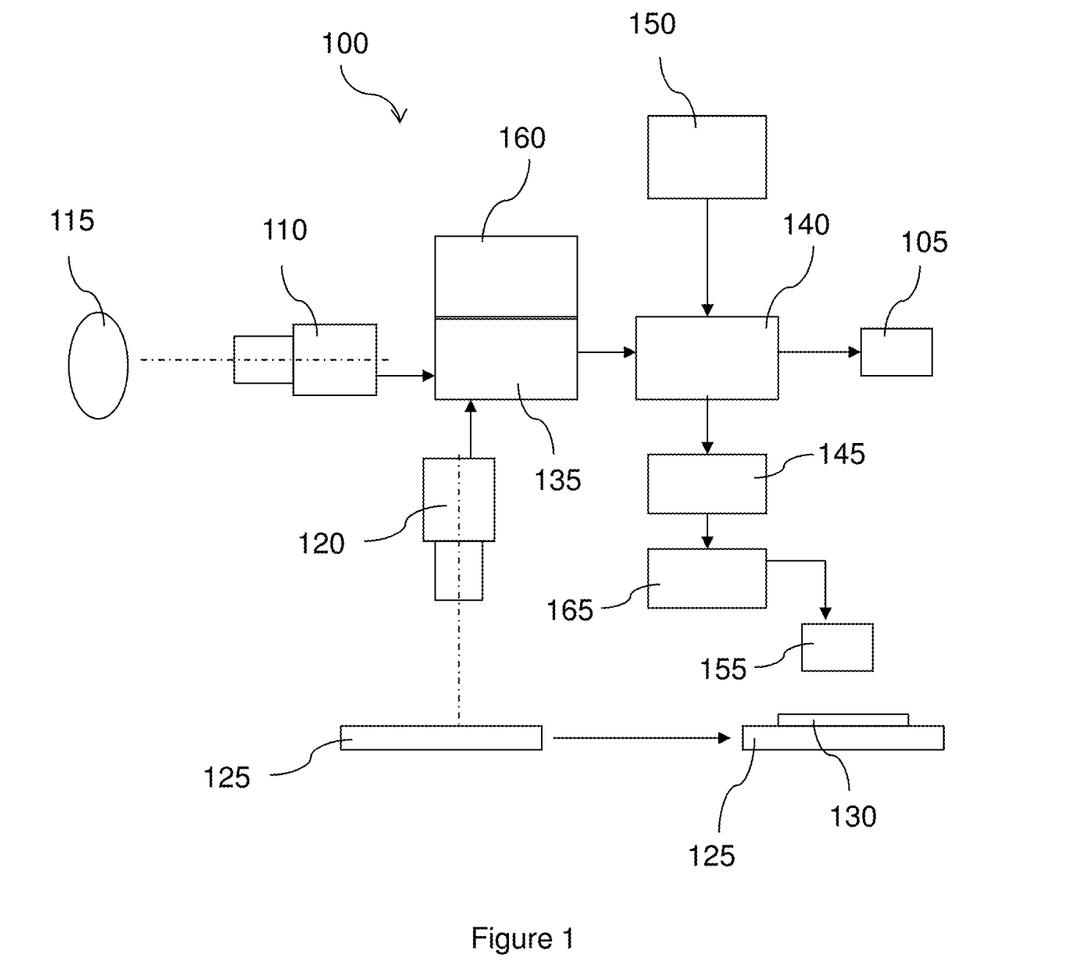
FIG. 1 represents, schematically, a particular embodiment of the protection device that is the subject of the present invention.

FIG. 1 shows a device 100 for protecting a document 125, which comprises:
- a means 110 for capturing a digital image of a person 115, generally a carrier of the document 125 and/or a signatory of a message carried by the document 125;
- a means for inputting a digital file, in the form of a means 120 for capturing a digital image of at least one portion of the document 125;
- a means 135 for extracting characteristic elements of one, at least, of the images made by the capture means 120;
- a means 160 for extracting positions of the characteristic elements extracted from one, at least, of the images made by the capture means 120;
- a means 150 for generating a message;
- a means 140 for encoding the message and characteristics of images;
- a means 145 for incorporating the encoded message and encoded characteristics in a digital matrix code;
- a means 165 for determining locations and shapes of matrix codes or portions of matrix codes (see the description of steps 240 and 245);
- a means 155 for printing, on or in the document 125, the analog matrix code 130 representative of the digital matrix code; and
- a storage means 105.

The means 110 and 120 for capturing digital images are electronic image sensors, for example electronic video cameras, electronic still cameras or smartphone image sensors. The means 120 for capturing a digital image of at least one portion of the document 125 can also be a scanner.

The capture means 110 is configured to capture biometric data of a person, for example fingerprints, the face or the shape of a hand. The capture means 110 is, in a variant, replaced by a memory holding a digital file representative of these biometric data.

The means 120 for capturing a digital image of at least one portion of the document 125 takes an image of the complete document 125, or at least one of its portions, for example of an identity photo or a photo of fingerprints or of a signature if the document is an identification document, of data carried by a document, if the document is an accounting or contractual document.

In some variants, only the means 120 for capturing digital images is provided in the device that is the subject of the invention.

The means 135 for extracting characteristic elements of one, at least, of the images made by the capture means 120 utilizes an image processing program to extract measurements, for example biometric, of at least one captured image. In the case of the image of a surface of a document, a known type of content recognition algorithm makes it possible to extract names, dates, amounts, signatures, images, fingerprints, ratios of lengths of printed lines, numbers of printed lines, etc.

For example, the means 135 for extracting characteristic information utilizes a parser or a template associated to the document or areas selected manually by an operator, for example with a pointing device such as a mouse.

Detailed below are other types of extracting characteristic information of a document.

For example, in the case where a document carries an image of a face, ratios of lengths between outlines of the eyes, nose, mouth, ears, hair roots can characterize a face, according to known techniques.

In the case of an image of a fingerprint, starting from a digital trace whose dimensions and angles have been normalized, singular points (including minutiae) that are also normalized are extracted. It is recalled here that a fingerprint or dactylogram is the result of placing a finger on a medium. The design formed on the medium consists of dermatoglyphs. Fingerprints are unique and characteristic of each individual.

A "digital trace", a broader term, is the result of a contact between a finger and a medium, fingerprints being an example of a digital trace. Papillary traces (or their imprints) group digital traces (or their imprints, in which automatic identification software reference 150 to 200 characteristic points) and palm prints (traces of the palms of the hand, referenced by 1,500 to 2,000 characteristic points).

The digital trace can be:
- visible (or direct): it is called positive when material is affixed, and it is called negative when material is removed;
- latent (invisible to the naked eye): the trace comes from deposited sweat (secretions from the sweat glands: 99% water that by evaporating leaves behind salts and amino-acids) and/or sebum deposits (sebaceous glands); and/or
- molded: the trace comes from a finger coming in contact with a malleable surface (wax, putty, etc).

The lines of the fingerprints can be broken down into three major design types: arches (including tented arches), left-handed/right-handed loops, and whorls (including coils and swirls). These three types of print fit 95% of human fingers: 60% for loops, 30% for whorls and 5% for arches. "Singularities" on the loops, arches or whorls are used to differentiate the patterns from one another:
- global singularities: core or center: where the ridges converge;
- delta: where the ridges diverge;

local singularities (AKA minutiae): irregular areas at the locations of capillary lines (ending ridges, bifurcations, short ridges assimilated to two ending ridges, enclosures).

Extracting characteristic elements can be a simple image compression, for example according to the JPEG (registered trademark) standard.

Lastly, all or part of the image constitutes characteristic elements of the image.

The means 160 for extracting positions of characteristic elements extracted from one, at least, of the images made by the capture means 120, identifies the position of each characteristic element, for example starting from a corner where, in relation to the larger side of the document joining this corner, the smallest side of this document joining this corner is at approximately 90°, and according to an orthogonal reference space oriented according to these side of the documents normalized in proportion to the length of these sides of the document. In this way, the position can be found automatically regardless of the magnification factor and regardless of the rotation (within a range of rotation angles of up to 180°).

The message generation means 150 supplies a message about where the document was produced, the production date, the name of the owner of the intellectual property rights on the document, etc. Alternatively, this message is a decoding key for the matrix code 130 or an identifier of a decoding key.

The means 140 for encoding the message, positions and characteristics of images performs a known type of encoding, for example encoding with the addition of an error detection and correction code (CRC, for Cyclic Redundancy Check) and an RSA (name formed from the initials of its three inventors, an asymmetric cryptography algorithm) type of encryption and scrambling, to supply a series of numbers representing the message, the positions and the extracted image characteristics.

The means 145 for incorporating the encoded message, encoded positions and encoded characteristics in a digital matrix code defines a dot matrix representing the series of numbers of the code supplied by the encoding means 140. For example, the message is incorporated into a central square, the resolution of which forms an anti-copy mark (ie the degradation of which by the print noise, ie the generation of individually unpredictable ad-hoc errors, leading a dot to be interpreted with an incorrect value, then copy noise can be measured to distinguish an original from a copy).

The means 155 for printing, on or in the document 125, the analog matrix code 130 is, for example, a printer or a marking means utilizing a laser ray.

The storage means 105 is local and/or remote, for example an online server memory, remote from the rest of the device, in which items of information are stored about the production and marking of the document 125 and, possibly, keys for deciphering information represented by the analog matrix code 130.

Figure 2:
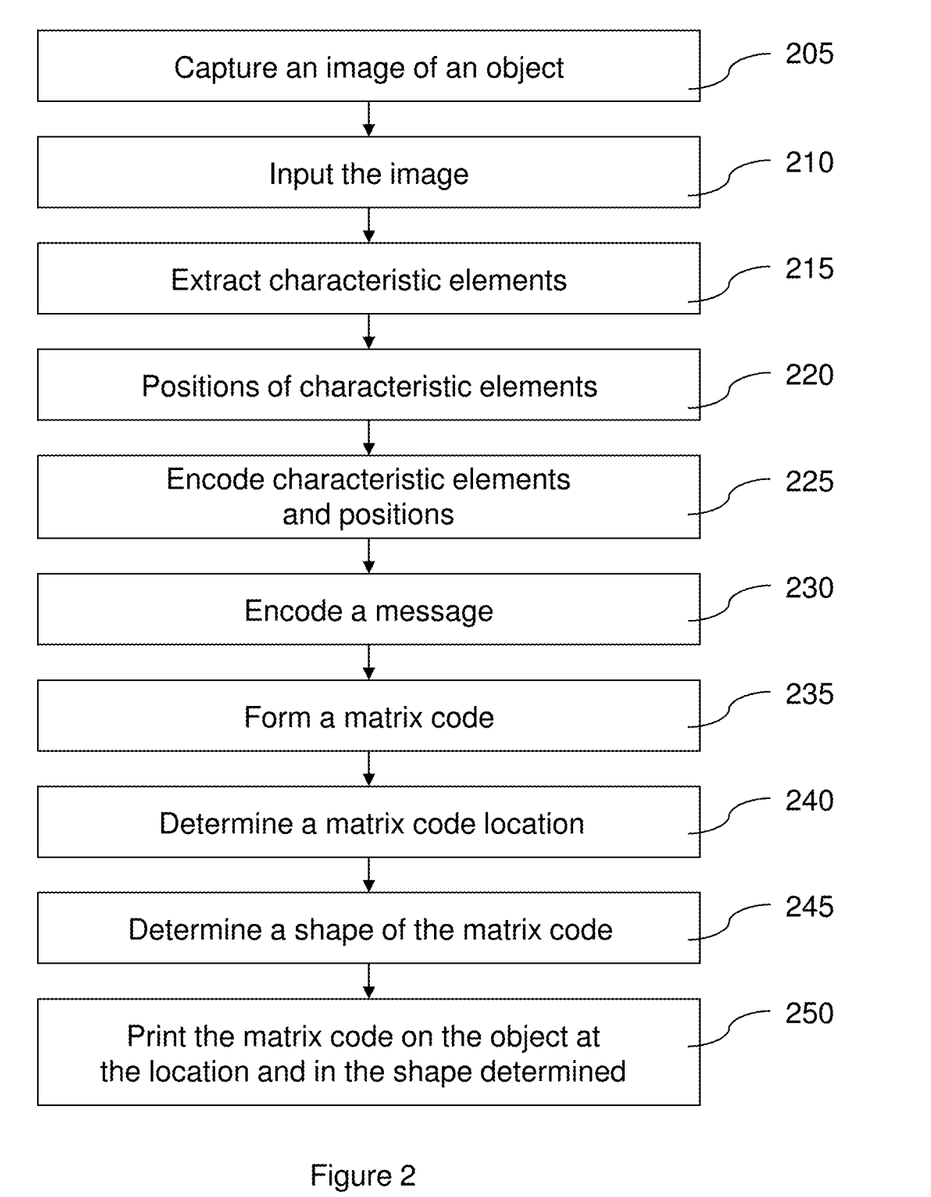
FIG. 2 represents, as a logical diagram, steps in a first particular embodiment of the protection method that is the subject of the present invention.

In the first particular embodiment of the protection method that is the subject of the present invention, illustrated in FIG. 2, the first step 205 consists of capturing an image of a document to be protected against forgery and against modifications. During a step 210, the captured image is input into a software system for extracting characteristic elements (measurements, ratios, outlines or dots, for example) or for compression, which, during step 215, supplies these characteristic elements.

During a step 220, the positions of extracted characteristic elements are identified in the document.

During a step 225, the characteristic elements and their positions are encoded.

During a step 230, a message is encoded. During a step 235, a digital matrix code is formed by incorporating encodings of the characteristic elements, of their positions and of the message.

During a step 240, available locations in the document for receiving the matrix code print are determined. For example, during the step 240, for each dot of the image of the document, outside predefined margins, one determines the distance from this dot to the nearest dot bearing information. Then one selects the largest area comprising dots for which this distance is greater than a predefined distance. For example, this predefined distance is equal to one twentieth of the length of the smallest side of the document. Then one determines whether this largest area can receive all the elements of the matrix code (for example 17 elements for the matrix code illustrated in FIG. 5).

If no area is found able to receive all the elements of the matrix code, the predefined distance is reduced, for example to one fortieth of the length of the smallest side of the document, and the search for the largest area is repeated.

If, again, no area is found able to receive all the elements of the matrix code, step 240 is repeated by determining, for each dot of the image of the document, outside predefined margins, the distance from this dot to the nearest area of the document bearing the characteristic information processed during step 215.

In this case, one authorizes the printing of the matrix code on a portion of the document bearing characteristic information, but on a portion of the document bearing the information processed during step 215.

During a step 245, one determines a shape of the matrix code to be printed. For example, during the step 245, in the largest area determined during the step 240, one tests successively the matrix code shapes in which the largest number of edges shared by two elements of the matrix code in descending order (for example, in the shape illustrated in FIG. 5, there are 26 common edges between the 17 elements of the matrix code). One determines whether the largest area can contain the shape considered. If not, one proceeds to the next shape. If yes, this shape is selected for printing the matrix code.

During a step 250, the digital matrix code is printed on the document an image of which was taken during step 205, at the location determined during step 240 and according to the shape determined during step 245.

In a variant, during step 240, one determines a plurality of locations (areas having the greatest distance to the information) and, during step 245, a plurality of shapes of portions of codes (shapes that fit into these locations). During step 250, one prints the code in portions using the locations determined during step 240 and the shapes determined during step 245.

The shape(s) selected and the location(s) selected can be described in a message carried by an anti-copy mark incorporated in the matrix code (see below).

Figure 3:
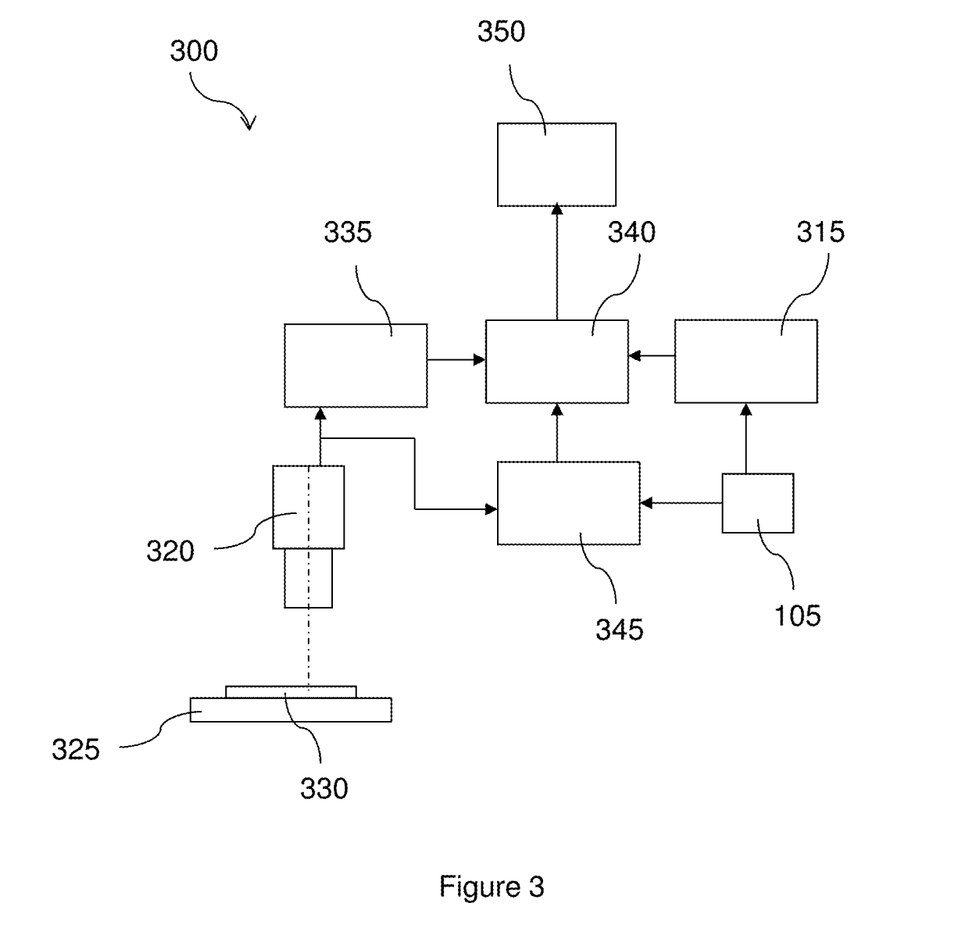
FIG. 3 represents, schematically, a particular embodiment of the control device that is the subject of the present invention.

The control device 300 that is the subject of the present invention illustrated in FIG. 3 comprises:
  a means for inputting a digital file, in the form of a means 320 for capturing a digital image of at least one portion of a candidate document 325 and of the matrix code 330 carried by this candidate document;
  a means 335 for extracting characteristic elements of one, at least, of the images made by the capture means 320;

a means 345 for decoding characteristic image elements encoded in the matrix code 330, possibly according to data supplied by the memory 105;

a means 315 for decoding positions of characteristic image elements encoded in the matrix code 330, possibly according to data supplied by the memory 105;

a means 340 for verifying the match between, firstly, the content of the characteristic elements of the image captured by the capture means 320 and the content of the characteristic elements encoded in the matrix code 330, and, secondly, between the positions of the characteristic elements of the image captured by the capture means 320 and the positions of the characteristic elements encoded in the matrix code 330;

a means 350 for decoding the message encoded in the matrix code 330, and for verifying the authenticity of the document, in the event of a match between the characteristic elements and their positions.

The means 320 for capturing digital images is similar to the means 120 except that it is configured to capture an image of sufficient resolution of the matrix code 330 so that it can be read.

The means 335 for extracting characteristic elements is similar to the means 135. The decoding means 345 performs inverse functions from the encoding means 140. However, the decoding means 345 only decodes the characteristic image elements and their positions encoded in the matrix code 330. The means 340 for verifying the match between the content and positions of the characteristic elements of the image captured by the capture means 320 and the characteristic elements encoded in the matrix code 330 determines a degree of similarity between these characteristic elements and these positions, and, if this degree of similarity is greater than a predefined limit value, it supplies an integrity confirmation piece of information for the candidate document 325. Otherwise, it supplies an integrity fault piece of information for the candidate document 325, meaning that its content or its shape has been altered, that it is a counterfeit, or that the biometric data encoded in the matrix code 330 do not match the biometric data carried by the candidate document 325.

The decoding means 350 performs inverse functions from the encoding means 140. However, the decoding means 350 only decodes the message carried by the matrix code 330, and only performs this decoding if an integrity confirmation piece of information is supplied by the match verification means 340. In addition, the decoding means 350 measures the noise carried by the anti-copy code representing the message, for example by counting the error correction rate required to read this message. The decoding means 350 determines the authenticity of the document as a function of the noise measured:

if this noise exceeds a predefined value, which depends upon the resolution of the anti-copy code, the document is reported as being a copy;

otherwise, the document is reported to be authentic.

Figure 4:
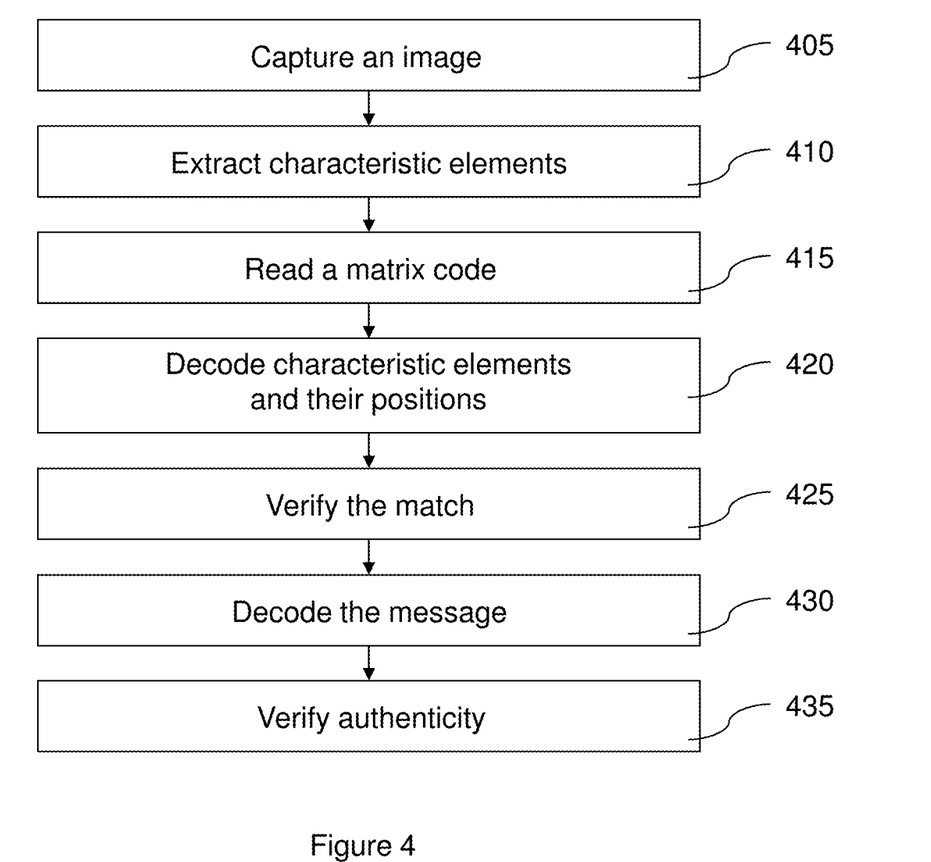
FIG. 4 represents, as a logical diagram, steps in a particular embodiment of the control method that is the subject of the present invention.

FIG. 4 shows, for verifying a document, ie verifying its integrity and its authenticity, a step 405 of capturing an image of at least one portion of the document, a step 410 of extracting characteristic elements of the captured image and their positions, a step 415 of capturing an image of a matrix code representing characteristic elements of an image and an additional message, a step 420 of decoding encoded characteristic elements and their positions in the matrix code, and a step 425 for verifying the match between the content and positions of the characteristic elements extracted during step 410 and the content and positions of the characteristic elements decoded during step 420.

In this way, it is possible to carry out the verification of the integrity of the content of the document without having to access a database.

If the match is verified during step 425, then during a step 430 the message encoded in the matrix code is decoded and supplied, for example displayed. During a step 435, the noise carried by the anti-copy code representing the message is measured, for example by counting the error correction rate required to read this message. Then the authenticity of the document is determined: If this noise exceeds a predefined value, which depends upon the resolution of the anti-copy code, the document is reported as being a copy. Otherwise, the document is reported to be authentic.

As a variant to the embodiments of the control device and method illustrated in FIGS. 3 and 4, the message represented by the anti-copy code represents or identifies a decoding key required to decode the characteristic image elements encoded in the digital matrix code 330.

As a variant to the embodiments of the control device and method illustrated in FIGS. 3 and 4, the digital matrix code 330 represents or identifies a decoding key required to decode the message carried by the anti-copy code.

Figure 5:
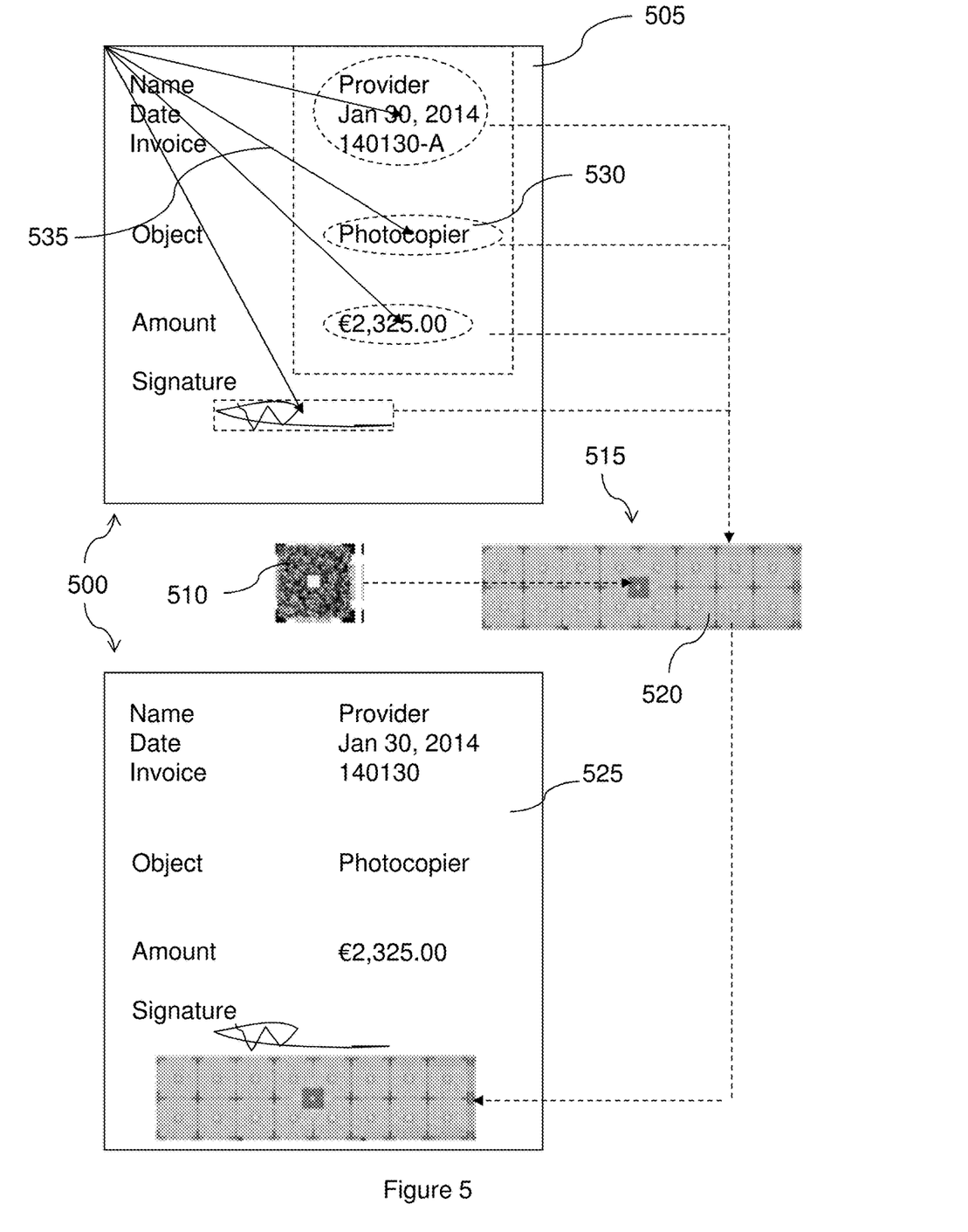
FIG. 5 represents, schematically, a first document to be protected, a protection mark and the document carrying the printed protection mark.

FIG. 5 shows a printed document, 500, and, more specifically, a signed invoice, before protection, above, and after protection, below. The document 500 comprises in a portion 505, an image of which is captured, characteristic indications, here the supplier name, the invoice date, the invoice number, the document invoiced, the invoice amount, and the signature. To protect this document, these indications are read automatically, for example with an optical character recognition ("OCR") and writing or handwritten signature recognition program, and these characteristic elements 530 of the image and their positions 535 in the document 500 are encoded, in sixteen portions 520 of a digital matrix code 515.

The inventors have determined that such a matrix code has a data storage capacity of at least 4 kilobytes, which makes it possible to store, in asymmetrically encrypted form:

the data read;
an identity photo;
minutiae; and
other identity information.

A message, for example representing an encoding key or a decoding key, or data relating to the encoding place and time, is encoded in a digital anti-copy code 510. The anti-copy code 510 is incorporated into the digital matrix code 515.

As illustrated in the bottom of FIG. 5, the digital matrix code 515 is printed on the document 500 to protect it. Printing the digital matrix code 515 forms an analog matrix code.

As is easily understood, to verify that the content of the document 500 has not been modified, firstly, a new image capture and a new extraction of characteristic elements and their positions are carried out, and, secondly, the analog digital matrix code 515 is read to extract the encoded characteristic elements and positions, before verifying the match between these characteristic elements and these positions.

It is noted that the match can, in this case, be verified visually by a user, for example after displaying decoded characteristic elements on a screen.

To verify the authenticity of the document 500, the noise carried by the anti-copy code representing the message is measured and compared to a predefined limit value. This limit value is, for example, learned in a learning step (not shown) from original documents 500 and copies made from these documents. In this way, two clouds of noise values are obtained, and a limit value is chosen between these value clouds.

Once these verifications have been carried out, decoding the anti-copy code 510 incorporated in the matrix code 515 makes it possible, firstly, to determine whether the document 500 is a copy and, secondly, to obtain an additional message representing for example indications (timestamp, name of the signatory, biometric data of the signatory, etc) relating to the document 500 or to its signatory, originator, recipient or owner.

Figure 6:
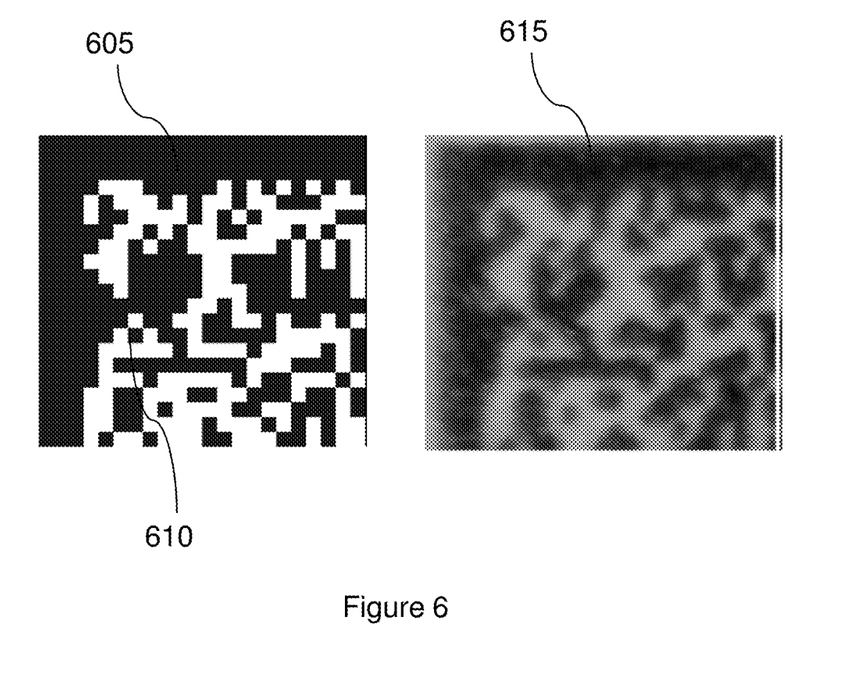
FIG. 6 represents portions of an anti-copy mark, respectively digital and analog (printed).

FIG. 6 shows a top left portion 605 of a digital anti-copy code 510 and the corresponding portion of the printed analog code. As can be seen, the digital anti-copy code consists of a matrix of rectangles 610 occupying cells arranged in rows and columns. Here, these rectangles only have two colors, black and white. In the printed analog code 615, significant noise due to the code being printed has deformed black rectangles, making some appear and making some disappear, in an unpredictable ad-hoc (ie cell by cell) way.

As a variant to the embodiments of the invention described above, a biometric key, ie determined from biometric data of the user, enables the content of the matrix code 130 to be accessed, to access either the characteristic elements of an image or the message stored by the anti-copy code.

In the case where, during the encoding or decoding of the characteristic elements, a symmetrical hash function is utilized to encrypt and verify the fingerprints, the results of the hash function (or "hash") serve, in variants, as a filter to give access to the reading of the message stored by the anti-copy code.

In some variants, the hash of the print of an index finger is used to descramble the anti-copy code or the matrix code.

There are, therefore, several approaches:
descrambling enables the person to be authenticated;
descrambling enables the document to be authenticated;
applying the hash leaves the content (payload) of the code readable (descrambling enables the physical legitimacy of the medium to be authenticated);
applying the hash leaves the identity of the code readable and makes the content (payload) of the code unreadable (access restricted to the payload); and/or
applying the hash makes the code unreadable (high security, without descrambling the symbol remains impossible to interpret).

When the anti-copy code is formed, characteristic points of the image of the fingerprint are used, hashed, to scramble the content of the anti-copy code, which is then printed on the original document.

When the anti-copy code is read, characteristic points of the new image of the fingerprint are used, hashed, to descramble the content of the anti-copy code, an image of which has been captured.

The hash function is, therefore, preferably symmetrical.

The invention claimed is:

1. Device for protecting a document, comprising:
an image sensor configured to generate a digital file representing an image of at least a part of the document;
a data processor configured to extract characteristic elements of the image and positions of said characteristic elements on the document, to generate a message containing information regarding the document, and to encode the message in an anti-copy mark, said data processor is further configured to encode into a matrix code said characteristic elements, data representative of the position of said characteristic elements and said anti-copy mark; and
a printer for printing the matrix code on or in said document.

2. Device according to claim 1, wherein the data processor is configured to determine a location of the document that bears no information, and wherein the printer is configured for printing the matrix code at said location.

3. Device according to claim 1, wherein said image sensor is configured to capture biometric data of a person and said characteristic elements includes information representative of the biometric data.

4. Device according to claim 2, wherein the data processor is configured to determine a shape of the matrix code corresponding to the location of the document that bears no information, and wherein the printer is configured for printing the matrix code according to the determined shape.

5. Device according to claim 4 further comprising a second image sensor configured to capture biometric data of a person and wherein said data processor is configured to extract characteristic elements of said biometric data.

6. Device according to claim 1, wherein the image sensor is configured such that the image is representative of biometric data items of a person, which biometric data items are also carried by the document.

7. Device according to claim 1, wherein the data processor is configured to encode characteristic elements of the image such that the matrix code comprises a plurality of areas representing the characteristic elements of the image.

8. Device according to claim 1, wherein the data processor is configured to use characteristic elements to encode the message.

9. Device according to claim 1, wherein the data processor is configured to use characteristics elements to scramble the message.

10. Device according to claim 1, wherein the data processor is configured to use characteristics elements to encode the characteristic elements.

11. Device according to claim 1, wherein the data processor is configured to compress the image.

12. Device according to claim 11, wherein the data processor performs a compression in JPEG (acronym for Joint Picture Expert Group) format.

13. Device according to claim 1, wherein the data processor is configured to extract fingerprint minutiae from the image.

14. Device according to claim 1, wherein the data processor utilizes a public key for encoding the content of the matrix code.

15. Method for securing a document, comprising:
inputting a digital file representing an image representative of at least one portion of the document;
extracting characteristic elements of the image and positions of said characteristic elements on the document;
generating message containing information regarding the document;
encoding the message into an anti-copy mark
encoding into a matrix code said anti-copy mark together with said characteristic elements of the image and data representative of the position of said characteristic elements on the document, into a matrix code; and
printing the matrix code on or in said document.

16. Device for controlling the authenticity of a candidate document, comprising:
- an image sensor for capturing an image of at least one portion of the document and an image of a matrix code carried by said document;
- a data processor configured to extract characteristic elements of the captured image
- the data processor further decoding the matrix code in order to decode:
  - an anti-copy mark including message containing information regarding the document characteristic elements of an image of an authentic document; and
  - positions of said characteristic elements in said authentic document;
- the data processor further verifying a content and position match between:
  - the extracted characteristic elements and the characteristic elements of the decoded authentic document.

17. Method for controlling the authenticity of a candidate document, comprising:
- capturing an image of at least one portion of the document;
- capturing an image of a matrix code carried by said document;
- extracting characteristic elements of the captured image;
- decoding the matrix code in order to decode:
  - an anti-copy mark including message containing information regarding the document characteristic elements of an image of an authentic document; and
  - positions of said characteristic elements in said authentic document;
- verifying a content and position match between: the extracted characteristic elements and the characteristic elements of the decoded authentic document.

* * * * *